United States Patent [19]

Macy

[11] Patent Number: 4,510,899

[45] Date of Patent: Apr. 16, 1985

[54] ELECTRONIC OVERSPEED SWITCH

[75] Inventor: Lawrence E. Macy, Daleville, Ind.

[73] Assignee: Muncie Power Product Inc., Muncie, Ind.

[21] Appl. No.: 605,842

[22] Filed: May 1, 1984

Related U.S. Application Data

[63] Continuation of Ser. No. 75,778, Sep. 17, 1979, abandoned.

[51] Int. Cl.$^3$ .................. F02P 11/00; F02B 77/08
[52] U.S. Cl. .................. 123/198 D; 123/351; 123/352
[58] Field of Search .......... 123/198 D, 350, 351, 123/352, 359

[56] References Cited

U.S. PATENT DOCUMENTS

| | | | |
|---|---|---|---|
| 3,767,972 | 10/1973 | Noddings et al. | 123/351 |
| 3,828,742 | 8/1974 | Weis | 123/351 |
| 3,866,584 | 2/1975 | Bigalke et al. | 123/350 |
| 3,878,915 | 4/1975 | Purland et al. | 123/350 |
| 3,893,108 | 7/1975 | McBride, Jr. et al. | 123/198 D |
| 3,993,038 | 11/1976 | Alt et al. | 123/198 D |
| 4,211,193 | 7/1980 | Cox et al. | 123/352 |

FOREIGN PATENT DOCUMENTS 2514404  10/1976  Fed. Rep. of Germany ... 123/198 D

*Primary Examiner*—Raymond A. Nelli

[57] ABSTRACT

An electrical speed control system for selectively connecting an accessory to a vehicle engine having a conventional alternator driven thereby, utilizes the voltage output of the alternator stator to determine the rotational speed of the engine, and permits the accessory to be connected to the engine when the shaft speed is at or below a maximum safe engagement speed, and disconnects the accessory when the speed is above a maximum safe speed for the accessory. The speed control system further prevents reengagement of the accessory after reaching and falling below the high-speed disengage point until the rotational speed of the engine has fallen below the maximum safe engagement speed level.

13 Claims, 3 Drawing Figures

ELECTRONIC OVERSPEED SWITCH

This is a continuation of application Ser. No. 75,778, filed Sept. 17, 1979, now abandoned.

BACKGROUND OF THE INVENTION

The present invention relates to a speed control system for an engine and, more specifically, relates to a speed control system which protects accessory equipment from damage resulting from operation at excessive speeds by disconnecting accessory equipment from the engine upon sensing an overspeed condition.

There are many situations where special purpose accessories are driven by gasoline or diesel engines capable of speeds exceeding safe speed of operation of the accessory. For example, a truck engine may be used to drive an accessory unit, such as an hydraulic pump. Typically, such truck engines are capable of speeds far in excess of speeds falling within the design limits of the accessory unit. Accordingly, the accessory unit may be damaged when the driving engine exceeds the maximum design speed of the accessory. Additionally, a problem is presented upon engagement of the accessory to the driving engine in these and other instances, since the accessory may be damaged not only by operating the accessory or the interface above a safe speed, but also by engaging it above a safe engagement speed.

Electronic speed switches are commercially available today and these provide some measure of overspeed control. However, they also usually require a sending unit such as a tachometer, mechanically linked to the engine, in order to provide overspeed sensing. Another deficiency in known speed control switches is that they typically permit the accessory to be reconnected to the driving engine at a speed below the maximum safe operating speed, but above a safe speed for engagement of the accessory to the engine. As indicated above, an accessory may be damaged not only by operating it at an excessive speed, but also by attempting to connect or disconnect it at speeds above idle but below the maximum safe accessory operating speed. Therefore, a need exists for some means to prevent accessory damage caused either by operating over speed or engaging at an unsafe speed. Further, extended operation at about the maximum safe speed can produce rapid, repeated engagement and disengagement of the accessory resulting in failure of the accessory and/or the interface in a relatively short time.

SUMMARY OF THE INVENTION

The present invention provides an electronic speed control system for selectively connecting an accessory to an engine having a rotating shaft. The speed control system includes apparatus for examining the frequency of the output voltage of the alternator provided with such engines to sense the rotational speed of the engine and produce a d.c. signal indicative of such speed. The speed signal is then utilized in a level sensing system, which determines whether the engine speed is below a first preselected voltage level or if the speed signal is above a second preselected voltage level. The sensing system produces an energization signal when the speed is below the first preselected level and interrupts this energization signal when the speed is above the second preselected level. The speed control of the present invention does not permit reengagement of the accessory to the engine until the engine speed has fallen below the first preselected level; thus eliminating damage that otherwise may result from oscillating conditions or engagement at above safe speeds.

The speed control of the present invention may be and is preferably connected to the existing alternator of the engine and obtains a signal therefrom; the frequency of which varies as a function of speed of the driving engine. This signal is converted to a DC voltage the amplitude of which varies with frequency. The level of the DC voltage is continuously sensed in a system of comparators. Two of the comparators have bias circuits connected to potentiometers to provide upper and lower reference voltage levels constituting the aforesaid first and second preselected voltage levels. This arrangement provides a convenient method for adjusting the engagement and disengagement engine speed levels required to accommodate various types of accessories. A comparator operated in the current mode provides a hysteresis circuit that produces a signal to cause the load to be engaged by the engine only if the DC voltage is below both reference voltage levels, permits engagement to be maintained when the DC voltage is between the two levels but does not permit reengagement in this latter state thus ensuring that the engine speed must drop to a safe engagement speed below both reference levels.

In the operation of the speed control system of the present invention, when the speed is sensed to be at or below a predetermined safe engagement speed, a relay coil is energized and a switch is actuated to energize the engine accessory interface and permit the accessory to be connected to the engine. As the engine speed increases above the safe engagement speed, the relay remains closed until a disengage speed is reached. At such speed, the relay coil is deenergized, the switch is opened, and the accessory is disconnected.

As indicated above, the relay coil is not reenergized until after the engine speed falls below the initial safe engagement speed, at which time the system reconnects the accessory to the engine. Operation of the engine at a speed below the disengage speed but above the safe engagement speed maintains the relay energized if it has been previously energized.

It is a principal object of the present invention to provide an electrical speed control system for selectively connecting an accessory to a rotating shaft of an engine only when the engine is operating at or below a safe engagement speed.

It is another object of the present invention to provide a speed control system employed as a means for determining the rotational speed of an engine shaft and the frequency of the output voltage from the engine's alternator.

Another object of the present invention is to employ a hysteresis circuit in an engine speed control system to prevent reengagement of an accessory at engine speeds above a safe engagement speed but in a safe operating speed.

DETAILED DESCRIPTION OF THE PREFERRED EMBODIMENT

Figure 1:
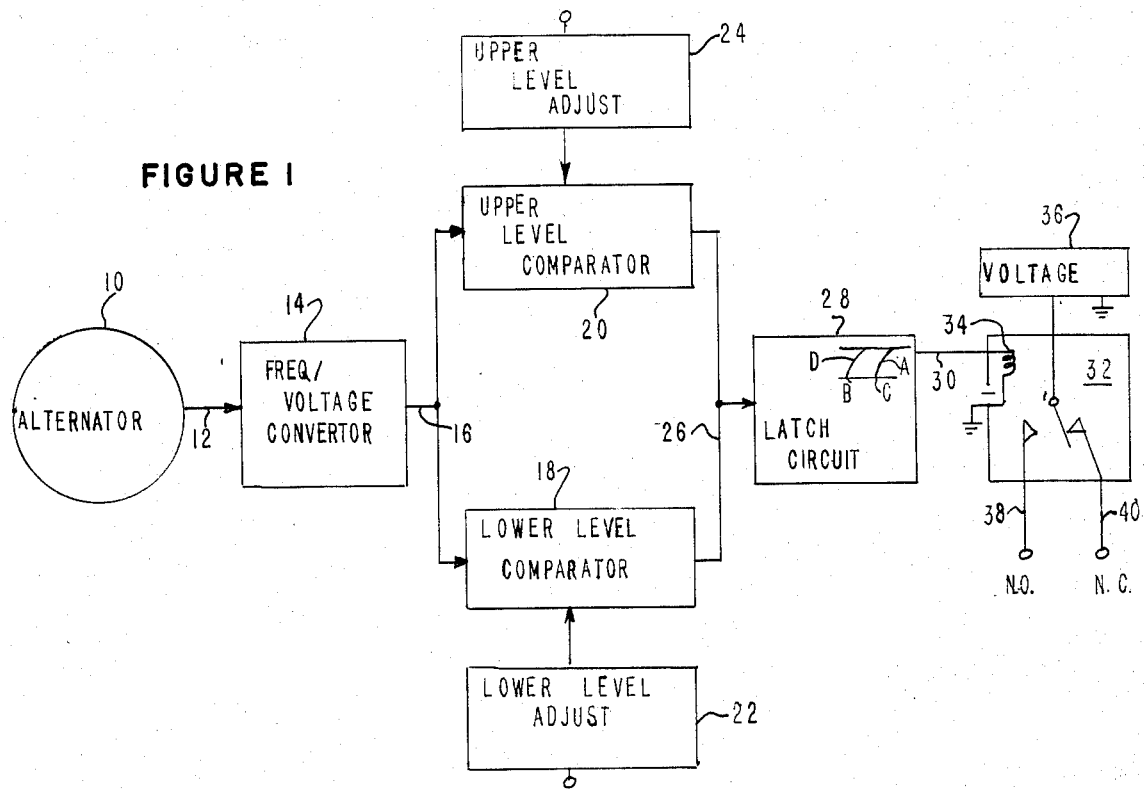
FIG. 1 is a block diagram showing the inventive speed control system.

Referring now to FIG. 1 of the accompanying drawings, a block diagram of the system of the present invention is set forth. The present invention is constructed and arranged such that the existing alternator 10, conventionally associated with almost all internal combustion engines produced within the last fifteen years, may be employed as the source of the speed related signal. The present invention obtains an AC signal from the stator of the alternator 10 on line 12 and feeds this signal to a frequency-to-DC voltage converter 14. The present invention contemplates that conventional alternators have seven poles or windings in the stator; the alternating signal produced thereby being well suited for conversion to a DC signal. It will be appreciated, of course, that the frequency of the signal on line 12 varies as a function of the speed of rotation of the engine.

Upon conversion of the signal on line 12 in the frequency-to-voltage converter 14, a speed signal is produced on line 16 which is essentially a DC analog signal, the level of which varies with the rotational velocity of the engine. This signal is fed to a lower level comparator 18 and an upper level comparator 20 where it is compared to a lower threshold voltage and an upper threshold voltage, respectively. The lower threshold voltage is an adjustable level which may be adjusted by the operator, as shown by block 22. Similarly, the upper threshold level may be adjusted by means of the upper level adjust 24. The comparators 18 and 20 each produce output signals on line 26; which line is connected to a latch or hysteresis circuit 28.

The upper and lower level comparators, 18 and 20, each produce a signal depending upon the relationship between the signal on lead 16 and the upper and lower threshold levels provided by circuits 22 and 24. Specifically, if the DC signal on lead 16 is below the threshold level provided by circuit 22, a signal is provided to the latch 28 by comparator 18. If the DC signal is below the threshold provided by element 24, comparator 20 provides a signal to the latch circuit 28. No signal is provided by the circuit 18 if the signal is above the threshold or by the comparator 20 if the signal on lead 16 is above the threshold of circuit 24.

The operating curve of the latch is illustrated in block 28; wherein the input and output signals are the abscissa and ordinate. respectively. When signals are produced by comparators 18 and 20, the input signal achieves level C and the output current rises along Curve A. Loss of the signal from comparator 18 only causes the input signal to drop to between levels B and C and the output current stays high. Loss of signal from both comparators causes the input signal to fall below level B and the current output falls along line D to its original level.

The latch circuit, when activated, provides an energization signal on line 30 which, in this embodiment, is fed to a relay 32 and serves to energize its relay coil 34. The relay 32 is connected to a current source 36 and, in a situation where the inventive device is used on an internal combustion engine, the voltage source 36 may be the battery of the engine. The relay 32 has associated with it a normally open terminal 38 and a normally closed terminal 40. The battery or voltage source 36 is connected to the actuator arm 42 of the relay. Accordingly, it may be seen that as the relay coil 34 is energized, the normally open terminal 38 is connected to the voltage source 36 through the actuator arm 42. It is contemplated that the accessory or accessory-engine interface will be connected to the normally open terminal 38 for actuation in response to the application of voltage thereto.

Figure 2:
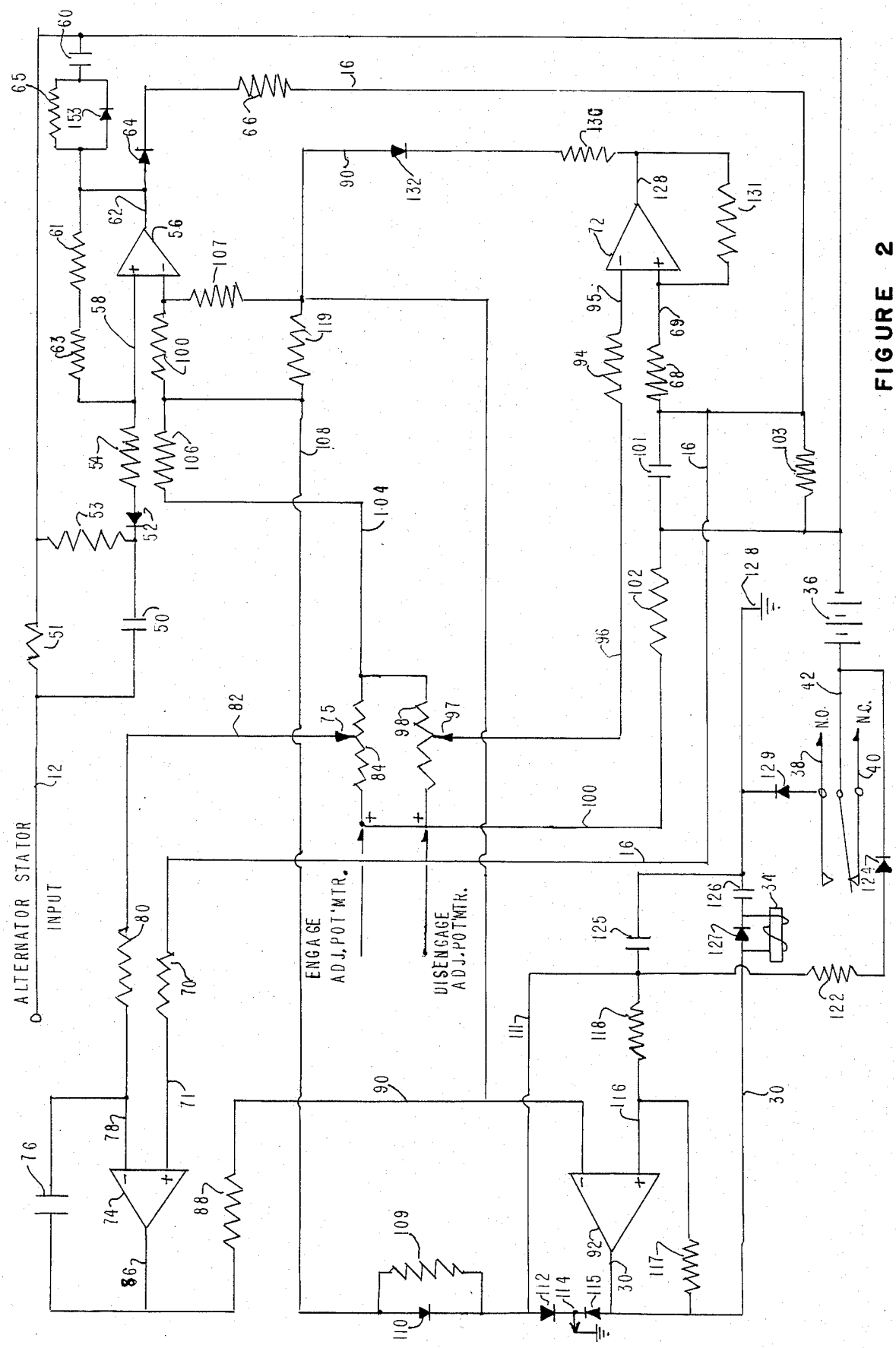
FIG. 2 is a detailed circuit diagram of the inventive system of FIG. 1.

Referring now to the circuit diagram of the system illustrated in FIG. 2, the frequency variable signal from the engine-associated alternator 10 is supplied on line 12 and is passed through a rectifier network consisting of capacitor 50 and resistors 51 and 53, diode or rectifier 52 and resistor 54 to an input circuit of a first operational amplifier 56. The operational amplifier 56 is provided with a feedback circuit consisting of resistors 61 and 63 so that it operates as an integrator and integrates the rectified input signal to produce an output signal having a DC level that is a function of the frequency of the input signal appearing on lead 12.

The operational amplifier 56 has its minus input terminal connected through a voltage divider network comprising resistors 100 106, 84 and 102 to the low side of battery 36.

The output signal on line 62 from the operational amplifier 56 is fed through a diode 64 and resistor 66 via lead 16 to the input resistor 68 and input resistor 70 of second and third operational amplifiers 72 and 74, respectively.

Operational amplifier 74 corresponds to the lower level comparator, 18 of FIG. 1, and is connected as an integrator by means of capacitor 76. The low level adjustment means of comparator 74 is provided by a potentiometer comprising the resistor 84 having a wiper 75 connected via lead 82 and resistor 80 to the negative terminal of the comparator. Access to this potentiometer is externally available to the operator of the equipment.

The output of the operational amplifier 74 is fed on line 86 through a resistor 88 via line 90 to the negative output terminal of a fourth operational amplifier 92.

The DC speed signal, on lead 16 is also fed to a third integrator amplifier 72 and is compared with a voltage on its negative terminal. This reference voltage is derived through a first resistor 94, connected via line 96 to wiper 97 of a second potentiometer 98. Potentiometer 98 is connected in parallel with the first potentiometer 84 and is placed across a voltage by way of line 100 through resistor 102 to the one side of the battery 36 and to the return side by way of line 104, resistor 106, line 108, parallel diode 110 and resistor 109, lead 111, resistor 122 and diode 124. The ground connection is via diode 112 to point 114.

Potentiometer 98 corresponds to the upper level adjusting means 24 of FIG. 1 and is also made externally available to the operator of the inventive unit, so that no disassembly is required in order to adjust the upper threshold level.

The operational amplifier 92 corresponds to the latching circuit 28 of FIG. 1 and has its positive input connected via lead 116 and resistor 118 to lead 111. The amplifier is operated in the current mode with feedback to the bias input provided via resistor 117. If current appears on both of leads 86 and 128, indicating that the signal on lead 16 is below both thresholds, the comparator 92 is rendered conductive. Current flow through the feedback, i.e., resistor 117, reduces the bias on lead 116 so that the signal on lead 128 is sufficient to sustain conduction of the comparator.

Conduction of the comparator 92, energizes the relay 34 closing contact 42 to contact 38 which is connected to the engine-accessory interface.

The four operational amplifiers comprising this preferred embodiment can be discrete components, or they can be formed on a single I C chip, which is commercially available, for example, National Semiconductor device LM 3900.

Figure 3:
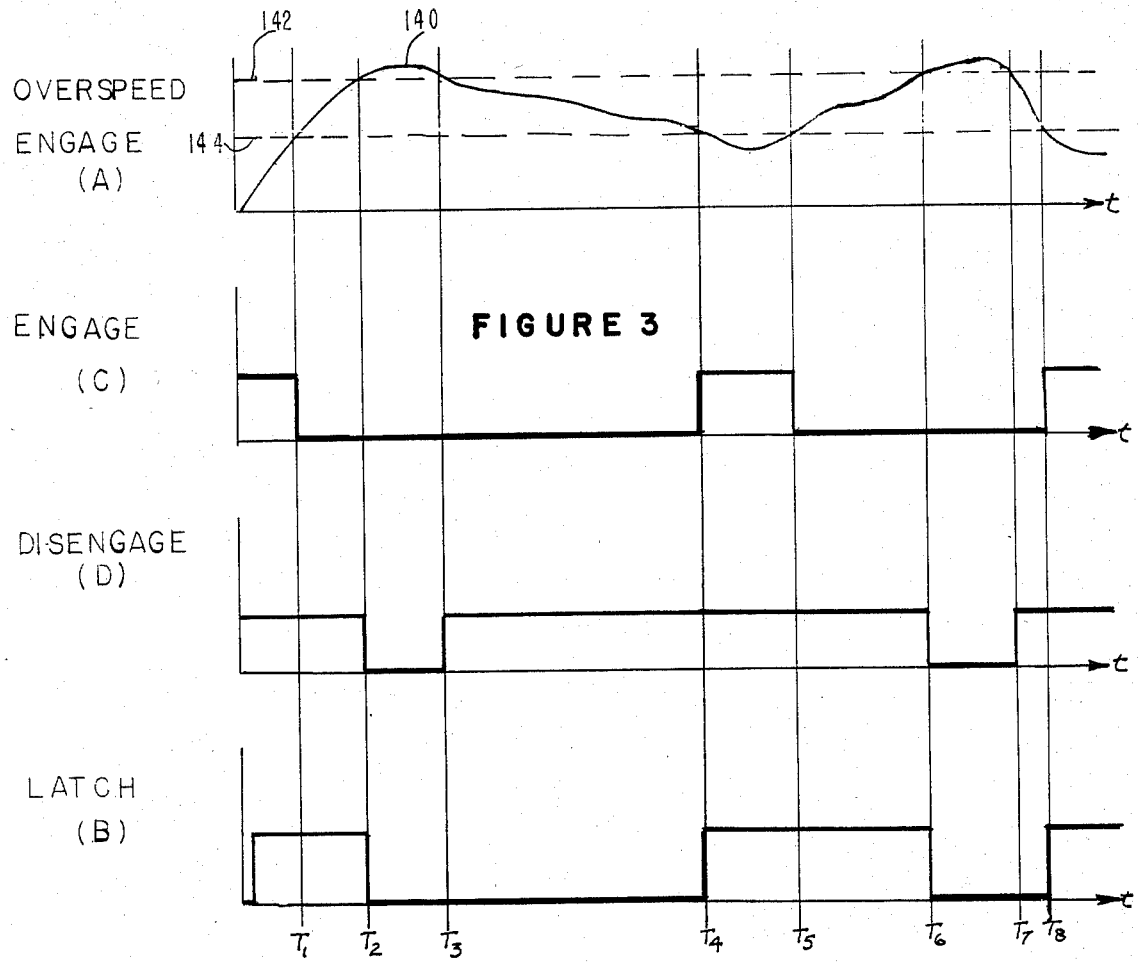
FIG. 3 is a graph showing the operation of the inventive speed control system of FIG. 1 in relation to the driving engine rotational speed.

With reference to the above-described circuit diagram, the operation of the present invention is now described with reference to the graphs of FIG. 3. FIG. 3 represents a plot of the voltage at four separate points in the circuit diagram of FIG. 2 and the system diagram of FIG. 1, plotted against continuous time on the abscissa.

Curve A represents the output voltage from the frequency to voltage converter, as represented by the voltage on line 16, and it may be seen that as the driving engine is speeded up and slowed down, the level of the signal varies accordingly. An upper threshold level, the overspeed level, is represented by the dashed line at 142, and the lower threshold level, the engage point, is represented by the dashed line at 144.

Wave form C represents the output signal on line 86 from the engage operational amplifier 74. It may be seen that when the input signal at terminal 71 of operational amplifier 74 is less than the reference voltage appearing on line 78, obtained by adjusting the wiper arm of potentiometer 84, operational amplifier 74 produces an output signal and continues to maintain this output signal until the speed curve A crosses the engage level 144, whereupon operational amplifier 74 ceases to produce an output signal. Operational amplifier 74 remains in this mode until the speed signal A falls below the engage level 144, whereupon at time $T_4$ the engage operational amplifier 74 again produces an output signal until the curve A again crosses the engage level 144 at time $T_5$, when the output ceases. Upon reaching time $T_8$, the curve A drops below the engage level 144 and operational amplifier 74 again produces an output signal.

Wave form D represents the output of the disengage operational amplifier 72 as represented at 128 in FIG. 2. An output is produced by operational amplifier 72 when the reference voltage at line 95 obtained from potentiometer 98 is greater than the voltage on the input at 69. Accordingly, operational amplifier 72 produces a signal at time $T_0$ and continues thus until the speed curve A crosses the overspeed threshold level 142 at time $T_2$, whereupon the operational amplifier 72 output at 128 ceases until the speed curve A drops below the overspeed threshold 142, which occurs at time $T_3$. The disengage operational amplifier has then sensed that the engine speed has dropped below the upper threshold level and, accordingly, an output signal is produced until the engine speed again rises above that threshold level, which occurs at time $T_6$. Similarly, at time $T_7$ when the speed drops below the overspeed 142, the disengage operational amplifier again produces an output signal.

Wave form B represents the output signal or energization signal from the latch circuit, appearing on line 30 of FIGS. 1 and 2. The rise time of this latch output signal is delayed for approximately two seconds due to the action of capacitor 126 in FIG. 2. This is shown by the relatively slow rise time of wave form B compared with the other wave forms. The two-second delay is to prevent chatter in the interface. As indicated in FIG. 2, the reference voltage of the latch operational amplifier 92 is selected so that operational amplifier 92 changes states only if the output from the engage operational amplifier 74 and the disengage operational amplifier 72 are present at line 90. Accordingly, it is seen that at time $T_0$ both wave forms C and D are high and accordingly, the output wave form B of the latch circuit is also high and remains high until both signals on line 90 are removed. This latter occurs at time $T_2$ at which time the latch is turned off and the energization signal discontinued. The latch remains off or interrupted until both operational amplifiers, 72 and 74, are again producing an output signal on line 90. This condition occurs at time $T_4$.

It is apparent that once the speed has reached the overspeed threshold level, 142, the energization signal to the relay is not produced until the driving engine speed falls below the engage level 144. The energization signal remains on until both of the comparators lose their output voltage, which occurs at point $T_6$, where the speed curve A exceeds the overspeed threshold 142. At this point, exemplary curve A shows a severe and sudden drop in engine speed and at time $T_8$ both of the operational amplifiers 72 and 74 produce an output.

The circuit of FIG. 2 employs, for example, circuit values as set forth below:

Battery 36:
12 VDC Supply from vehicle Electrical System
Capacitors:
50 & 60 = .0022 mfd. 16 v
101, 125, 126 = 8.2 mfd. Electrolytic (TIM 825) 15 v
76-.022 mfd. 100 v
Diodes:

| | |
|---|---|
| 52 = 100 v 20 ma | 127 = 20 v 200 ma |
| 153 = 100 v 20 ma | 115 = 20 v 200 ma |
| 64 = 20 v 200 ma | 112 = 20 v 200 ma |
| 132 = 100 v 20 ma | 110 = 100 v 20 ma |
| 124 = 20 v 200 ma | 129 = 400 v 30 a (IN4004) |

Relay:
34 = 65FP1A Sigma
Resistors:

| | | |
|---|---|---|
| 51 = 470 | 119 = 3.3 M | 118 = 1.8 M |
| 53 = 10K | 66 = 1K | 117 = 680K |
| 54 = 2.2 M | 130 = 100K | 109 = 220K |
| 63 = 100K | 131 = 18 M | 88 = 1 M |
| 61 = 820K | 94 = 689K | 70 = 1 M |
| 65 = 1 M | 68 = 1 M | 80 = 820K |
| 106 = 4.7K | 103 = 10K | 84 = 10K (Adjustable) |
| 100 = 2.2 M | 102 = 8.2K | 98 = 10K (Adjustable) |
| 107 = 100K | 122 = 1K | |

The foregoing description is presented by way of example only and is not intended to limit the scope of the present invention, except as set forth in the appended claims. For example, the relay could be replaced by a solid-state switch, such as a silicon controlled rectifier, connected in the conventional manner.

What I claim is:

1. An electrical speed control system for selectively connecting an accessory to an engine having a rotating electric signal producing device and a rotating shaft, said speed control system comprising:
    means connected to receive a signal from said signal producing device for producing a speed signal indicative of the rotational speed of said shaft;
    signal level sensing means connected to receive said speed signal for determining if said speed signal is indicative of a speed below a preselected first level and if said speed signal is indicative of a speed above a preselected second level, and for producing an energization signal whenever said speed signal is below said first preselected threshold level, for interrupting said energizing signal when said speed signal is above said second level for maintaining said interruption of said energization signal until said speed signal falls below said first preselected level and for reestablishing said energizing signal when said speed signal again falls below said first preselected level; and switch means connected to said accessory means, and a source of electrical power, said energization signal actuating said switch whenever said energization signal is present.

2. The system of claim 1, wherein said means for producing a speed signal includes a frequency to voltage converter electrically connected to the output of said electrical signal producing device.

3. The system of claim 1 further comprising means for manually adjusting said first preselected level.

4. The system of claim 1 further comprising means for manually adjusting said second preselected level.

5. The system of claim 1, wherein said signal level sensing means comprises:
 first comparator means connected to said speed signal for producing an output signal indicating when said speed signal is below said first preselected level;
 second comparator means connected to said speed signal for producing an output signal indicating when said speed signal is below said second preselected level; and
 latch means connected to said first and second comparator output signals for producing said energization signal when said first comparator means output signal is present, for interrupting said energization signal when said second comparator means output signal is absent, and for maintaining said interruption until both first and second comparator means output signals are present simultaneously.

6. An electronic speed control system for use in selectively controlling the driving of an accessory by the rotating shaft of an engine of the type employing an alternator; said system comprising:
 convertor means electrically connected to said alternator for producing a rotational speed signal which is a function of the rotational speed of said rotating shaft;
 first level detecting means connected to receive said rotational speed signal for producing an output signal indicating that the speed is below a first preselected threshold level;
 latch means connected to receive said first and second level detecting means output signals for producing an output signal only if said speed is below said first preselected threshold level, has exceeded said first preselected threshold level and is below said second preselected threshold level and having exceeded said second level, falls below said first preselected threshold level; and
 switch means connected to receive said output signal of said latch means and connected to said accessory and an electric power source for actuating said accessory only upon the occurrence of said output signal from said latch means.

7. The system of claim 6, further comprising means for manually adjusting said first preselected threshold level.

8. The system of claim 6, further comprising means for manually adjusting said second preselected threshold level.

9. The system of claim 6, wherein said first level detecting means comprises a comparator having one input connected to said rotational speed signal and the other input connected to the wiper arm of a potentiometer for setting said first preselected threshold level.

10. The system of claim 6, wherein said second level detecting means comprises a comparator having one input connected to said rotational speed signal and the other input connected to the wiper arm of a potentiometer for setting said second preselected threshold level.

11. An electronic speed control system for use in selectively controlling the driving of an accessory by a rotating shaft, said system comprising:
 means connected to said rotating shaft for producing a speed signal which is a function of the rotational speed of said rotating shaft;
 first level detecting means connected to receive said speed signal for producing an output signal indicating that the speed is below a first preselected threshold level;
 second level detecting means connected to receive said speed signal for producing an output signal indicating that the speed is above a second predetermined threshold level;
 latch means connected to receive said first and second level detecting means output signals for producing an output signal only if said speed is below said first preselected threshold level, has exceeded said first preselected threshold level and is below said second preselected threshold level and having exceeded said second level, falls below said first preselected threshold level; and
 switch means connected to receive said output signal of said latch means and connected to said accessory and an electric power source for actuating said accessory only upon the occurrence of said output signal from said latch means.

12. In combination with a system for driving an accessory from an engine wherein the accessory cannot be safely connected to the engine above a first engine speed and once connected, cannot be safely operated above a second engine speed, a speed control system having a first means for selectively connecting and disconnecting an accessory to and from the engine, the engine having a rotating shaft and a signal generating device for producing a speed signal indicative of the speed of rotation of the rotating shaft; said speed control system comprising:
 second means establishing a first signal level indicative of said first engine speed,
 third means establishing a second signal level indicative of said second engine speed,
 said first means permitting connection of an accessory to the rotating shaft only when said speed signal is less than said first signal level and causing an accessory to be disconnected from said rotating shaft when said speed signal exceeds said second signal level,
 said first means permitting reconnection of an accessory to the rotating shaft after an accessory has been disconnected from the rotating shaft only when said speed signal is again less than said first signal level.

13. In combination with a system for driving an accessory from an engine wherein the accessory cannot be safely connected to the engine above a first engine speed and once connected, cannot be safely operated above a second engine speed, a speed control system having a means for selectively connecting the accessory to the engine, the engine having a rotating shaft and a signal generating device for producing a speed signal indicative of the speed of rotation of the rotating shaft; said speed control system comprising:

first means connected to receive said speed signal from said signal generating device, second means establishing a first signal level indicative of said first engine speed, third means establishing a second signal level indicative of said second engine speed, fourth means permitting connection of an accessory to the rotating shaft only when said speed signal is less than said first signal level, and fifth means causing an accessory to be disconnected from said rotating shaft when said speed signal exceeds said second signal level, said fourth means permitting reconnection of an accessory to the rotating shaft after an accessory has been disconnected by said fifth means only when said speed signal signal is again less than said first signal level.

* * * * *

UNITED STATES PATENT AND TRADEMARK OFFICE
CERTIFICATE OF CORRECTION

PATENT NO. : 4,510,899

DATED : April 16, 1985

INVENTOR(S) : Lawrence E. Macy

Page 1 of 2

It is certified that error appears in the above-identified patent and that said Letters Patent is hereby corrected as shown below:

The full text of claim 6 appears below:

6. An electronic speed control system for use in selectively controlling the driving of an accessory by the rotating shaft of an engine of the type employing an alternator; said system comprising:

convertor means electrically connected to said alternator for producing a rotational speed signal which is a function of the rotational speed of said rotating shaft;

first level detecting means connected to receive said rotational speed signal for producing an output signal indicating that the speed is below a first preselected threshold level;

second level detecting means connected to receive said rotational speed signal for producing an output signal indicating that the speed is above a second predetermined threshold level;

latch means connected to receive said first and second level detecting means output signals for producing an output signal only if said speed is below said first preselected threshold level, has exceeded said first preselected threshold level and is below said second preselected threshold level and having exceeded said second level, falls below said first preselected threshold level; and

UNITED STATES PATENT AND TRADEMARK OFFICE
CERTIFICATE OF CORRECTION

PATENT NO. : 4,510,899

DATED : April 16, 1985

INVENTOR(S) : Lawrence E. Macy

It is certified that error appears in the above-identified patent and that said Letters Patent is hereby corrected as shown below:

switch means connected to receive said output signal of said latch means and connected to said accessory and an electric power source for actuating said accessory only upon the occurrence of said output signal from said latch means.

Signed and Sealed this

Eleventh Day of February 1986

[SEAL]

Attest:

DONALD J. QUIGG

Attesting Officer

Commissioner of Patents and Trademarks